United States Patent [19]
Cole

[11] 4,054,254
[45] Oct. 18, 1977

[54] ROLLING AIRFRAME AUTOPILOT

[75] Inventor: Donald E. Cole, Covina, Calif.

[73] Assignee: General Dynamics Corporation, Pomona, Calif.

[21] Appl. No.: 637,565

[22] Filed: Dec. 4, 1975

[51] Int. Cl.² .............................................. F42B 15/02
[52] U.S. Cl. .................................. 244/3.21; 73/517 R
[58] Field of Search .................... 244/3.15, 3.21, 3.23; 73/517; 310/8.4

[56] References Cited
U.S. PATENT DOCUMENTS 2,963,911 12/1960 Courtney-Pratt et al. ........ 310/8.4 X
3,154,015 10/1964 Muller ................................ 244/3.21
3,946,968 3/1976 Stallard .............................. 244/3.21

Primary Examiner—Verlin R. Pendegrass
Attorney, Agent, or Firm—Neil F. Martin; Edward B. Johnson

[57] ABSTRACT

The autopilot incorporates a single linear accelerometer transducer and a single pitch rate sensor. The outputs of the accelerometer and pitch rate sensor are summed with the command signal in the control circuit. A servo is controlled by the modified control signal to vary the incidence of a single plane control system, in an intentionally rolling airframe.

8 Claims, 12 Drawing Figures

ROLLING AIRFRAME AUTOPILOT

BACKGROUND OF THE INVENTION

Airframes designed for intentionally induced and maintained roll rates about their longitudinal axes have significant practical advantages over roll stabilized airframes. The rolling airframe concept has been applied to air and surface launched missiles. Such missiles may be spun up initially by the launcher and then utilize canted control surfaces to maintain a roll rate of approximately 5 to 15 revolutions per second. With such a roll rate, it is possible to utilize a single control plane to guide the missile in all three earth related axes. In a typical instance, the control system utilizes a single pair of variable incidence control surfaces to pitch the missile about the control plane at a selected instantaneous rotational orientation upon command from a guidance command signal. Thus, with such a missile operating in a level flight attitude, to cause the missile to climb, a guidance command signal must vary in amplitude at a frequency equal to the roll rate of the missile. For the example given, the guidance command signal would be a generally sinusoidal waveform that would induce pitch-up as the control plane of the vehicle approaches earth vertical and pitch-down after the control plane rotates and nears a one-half revolution from pitch-up, thereby producing a vertical angle of attack. The angle of attack produces body lift and alters the missile course from a horizontal to a climbing course. Similarly, a course change to the right would be effectuated by a sinusoidal signal displaced 90° from the signal required for a vertical course change.

Because the rolling airframe missile has a simplified control system, a reduction in cost and increase in reliability is realized over stablized airframe. However, an effective and practical autopilot has not previously been developed for rolling airframe missiles, and therefore, all such designs to date have incorporated open-loop control. The systems utilized are designated open-loop in that they utilize a control demand that is not modified by feed-back as to the actual changes resulting in the missile flight parameters. Such open-loop control requires that the missile process a high degree of aerodynamic stability. The stability required is similar to that associated with low performance manned aircraft to cause the aircraft to return to a straight and level flight attitude after control pressures are removed. The stability requirement dictates that the center of pressure for the missile must be located aft of the center of gravity. Such a static stability inherently reduces the maneuverability of the airframe in that the control surfaces must first offset the stability generated forces to achieve a given angle of attack. Further, the lack of a feedback system can result in over-shoot of a selected maneuver limit. Therefore, all of the airframe components and operating parameters in such a system must be conservative to insure the structural integrity of the airframe during operating conditions.

Conventional autopilot technology is not readily adaptable to the rolling airframe environment. In the conventional autopilot, fully stabilized flight and controlled maneuvers are obtained by detecting acceleration, rate and/or attitude with respect to the three related axes (i.e., ptich, yaw, roll). Such an autopilot then commands the airframe via the three axes control system to appropriately correct for detected errors in the flight path. The object of such an autopilot in straight and level flight is to produce a zero velocity of the airframe about each of the three earth related axes. Accordingly, the sensors utilized must be accurate and not have a DC offset at zero velocity. Such autopilots are sensitive and utilize complex mechanisms and therefore, are expensive and relatively unreliable. The complexity of a conventional autopilot is further increased by attempts to adapt it to a rolling airframe. In addition, many sensors suitable for use in the non-rolling environment cannot function effectively when subjected to continuous roll environments.

The lack of a practical autopilot for rolling airframes has limited their potential, particularly for high maneuverability applications. Therefore, it is desirable to have a rolling airframe autopilot capable of supplanting static aerodynamic stability, especially where such a rolling airframe autopilot is less complex than conventional non-rolling airframe autopilots.

SUMMARY OF THE INVENTION

According to the invention, a rolling airframe autopilot has been devised wherein a single linear accelerometer provides adequate feed-back to stabilize a rolling airframe. According to a further precept of the invention, a pitch rate sensor may be incorporated with the linear accelerometer to damp the control signals and thereby to permit higher maneuverability without over stressing the airframe or components.

In the exemplary embodiment, the airframe comprises an elongated generally cylindrical body with a control system that is effective in a single plane referred to as the control plane. Rotation in the control plane is referred to as pitch. The control system may use reaction jets or aerodynamic mechanism for producing a force that causes a pitch rotation of the airframe and therefore, an angle of attack relative to the flight path. In the exemplary embodiment, the pitch angle control system comprises a pair of canard wings. Control system drive means are provided in the form of a servo to respond to the output of the autopilot by varying the incidence of the canard wings. A pitch rate sensor is mounted on the airframe for detecting the rate of pitch angle change in the control plane.

It may be assumed for purposes of this summary that the airframe has a near neutral static stability in pitch so that any perturbation in pitch angle will not be corrected by the airframe aerodynamics. A guidance command signal is modified by the output of the accelerometer and pitch rate sensor to produce a proper control signal input to the control servo.

If it is assumed that the missile is in horizontal flight and no guidance command signal is present, then any perturbation from the horizontal in-pitch about a space plane will produce a cyclic signal from the accelerometer as the airframe rotates. Since the accelerometer is aligned with, and is sensitive only to acceleration in the control plane, then as the control plane rotates with the airframe the signal produced by the accelerometer will vary in a generally sinusoidal pattern with its maximum signal levels corresponding to the position where the control plane is aligned with the acceleration force on the airframe induced by the assumed angle of attack.

The accelerometer is physically arranged so that its output is opposite in sense to that of the airframe acceleration. Thus, when added to the now zero guidance command signal, the accelerometer output produces a negative feed-back and causes the control servo to induce a pitch rotation of the airframe to return the airframe to alignment with the flight path. Since the accelerometer signal is a sinusoidal variation, then the movement of the control surfaces will also vary in a sinusoidal pattern from a negative angle of incidence to a positive angle of incidence with each 180° of roll.

The pitch rate sensor makes it possible for the airframe to regularly, closely approach the maximum design limits of the airframe in maneuvers without exceeding those design limits. The instrument measures angular rate or velocity in the control plane and therefore, measures the rate at which the airframe is assuming a new angle of attack. By utilizing the output of the pitch rate sensor as a damping signal on the guidance command signal, the resulting damped control signal minimizes the over-shoot of the missile as it approaches an angle of attack that will provide the desired G force.

It is therefore an object of the invention to provide a new and improved rolling airframe autopilot.

It is another object of the invention to provide a new and improved rolling airframe autopilot that does not require DC instrumentation.

It is another object of the invention to provide a new and improved rolling airframe autopilot that is relatively low in cost.

It is another object of the invention to provide a new and improved rolling airframe autopilot that is usable with airframes having substantial neutral static ability.

It is another object of the invention to provide a new and improved rolling airframe autopilot that allows the associated airframe to achieve high maneuverability.

It is another object of the invention to provide a new and improved rolling airframe autopilot that is small in size and light in weight.

It is another object of the invention to provide a new and improved rolling airframe autopilot that is highly reliable.

Other objects and many attendant advantages of the invention will become more apparent upon a reading of the following detailed description together with the drawings, in which like reference numerals refer to like parts throughout and in which.

DETAILED DESCRIPTION OF THE DRAWINGS

Figure 1:
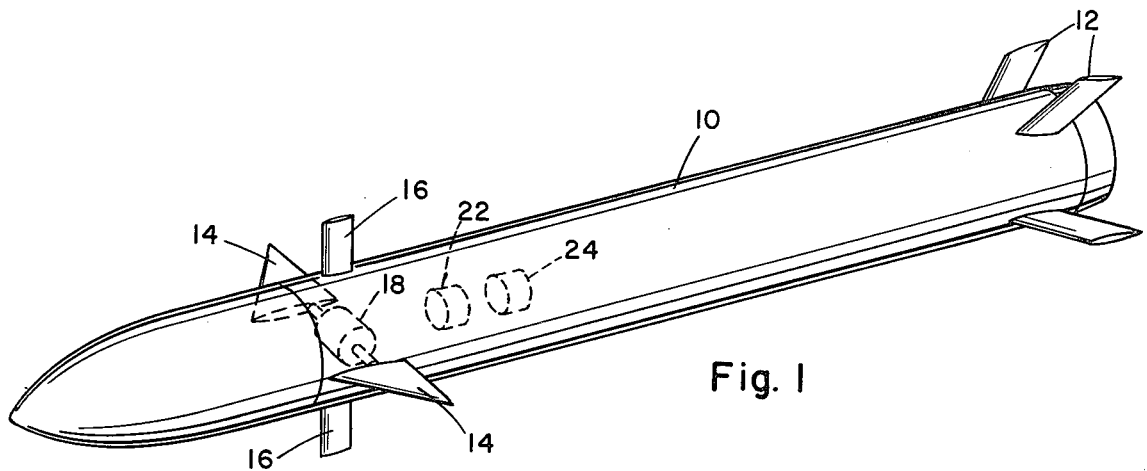
FIG. 1 is a perspective view of a typical missile incorporating the autopilot.
Figure 2:
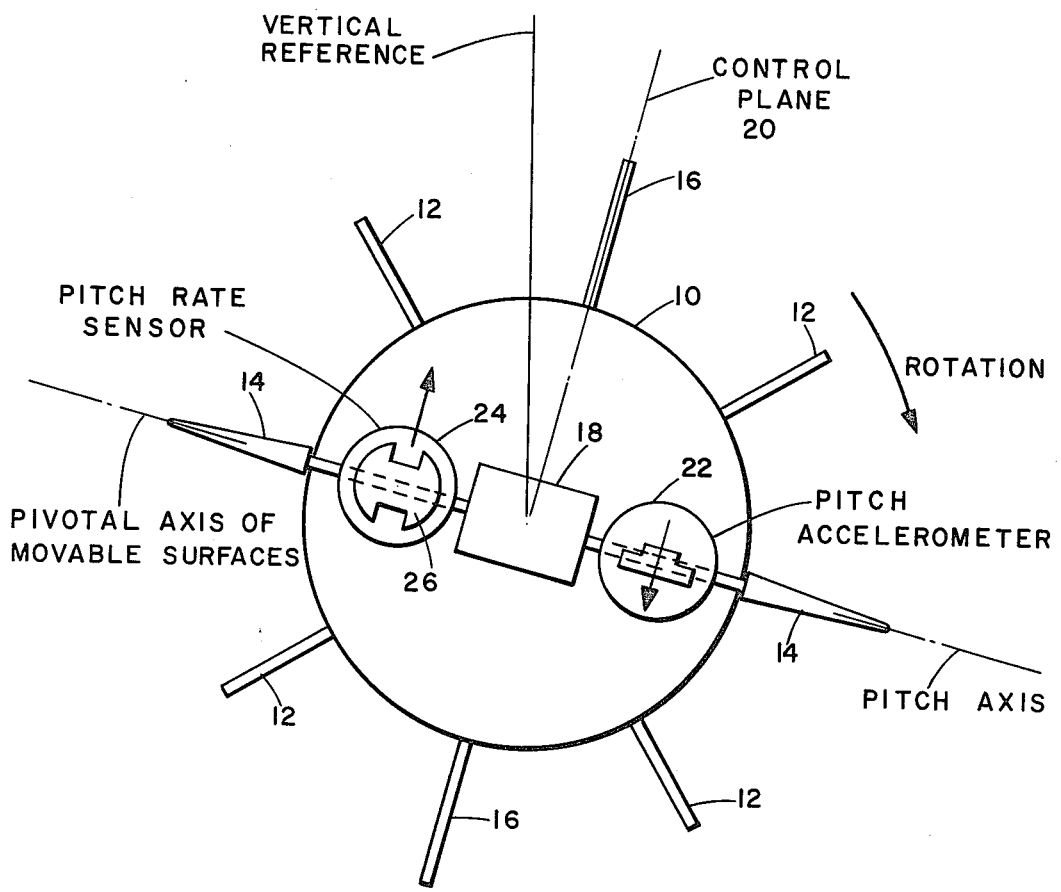
FIG. 2 is a diagrammatic view, as taken from the rear of the missile, illustrating the components and directional relationships.

An airframe 10 is illustrated as comprising an elongated generally cylindrical body of revolution. Four roll inducing surfaces 12, two variable incidence canard surfaces 14 and two fixed incidence canard surfaces 16 are provided. The canard surfaces 14 may be rotated to positive and negative angles of incidence by a servo drive 18. The canard surfaces 14 control pitch in a plane passing through the longitudinal axis of the missile and perpendicular to the axis of rotation of the control surfaces. This plane is referred to as the control plane. References to up or down on the control plane are vehicle related directions. The orientation of the control plane is illustrated diagramatically at 20 in FIG. 2.

The roll inducing surfaces 12, together with an initial spin-up of the missile provided by the launcher result in a roll rate about the longitudinal axis of approximately 10 revolutions per second. Steering control of the airframe is accomplished by varying the incidence of the control surfaces 14 in a cyclical manner to correspond to the instantaneous position of the control plane. For example, with the vehicle negotiating a horizontal flight path and if it is desired to cause the vehicle to be steered in a curved path to the left, the control surfaces 14 are given a positive angle of attack which is at a maximum when the up section of the control plane is in the left 180° of rotation. Ignoring control reaction delay, the positive incidence angle reaches a maximum as the control plane 20 is at the earth related horizontal (the vehicle related up section of the control plane to the left). During the next 90° of rotation, the positive incidence of the control surface is reduced to zero, and in the succeeding 90° of rotation is moved to negative angles of attack reaching a maximum when the control plane is again horizontal but with the vehicle related up section to the left. The movement of the control surfaces 14 corresponds to a sinusoidal variation with a frequency equal to the roll rate and with the relative phase determined by the direction of the desired correction.

Referring again to FIG. 2, there is illustrated a linear accelerometer 22 and a pitch rate sensor 24. Accelerometer 22 is mounted on the airframe with its sensitive axis lying in the control plane but inverted relative to the airframe vertical so that the accelerometer 22 produces a signal corresponding to acceleration in the control plane but with the opposite sense. The roll rate of the airframe will produce a sinusoidal variation on the accelerometer at the roll frequency. This makes it possible to use a wide range of accelerometers which are not sensitive to DC variations in acceleration, and for which DC biases or offsets are not critical. For example, a piezoelectric or piezoresistive device with a wheatstone bridge may be utilized in achieving an accelerometer with no moving parts.

Figure 3:
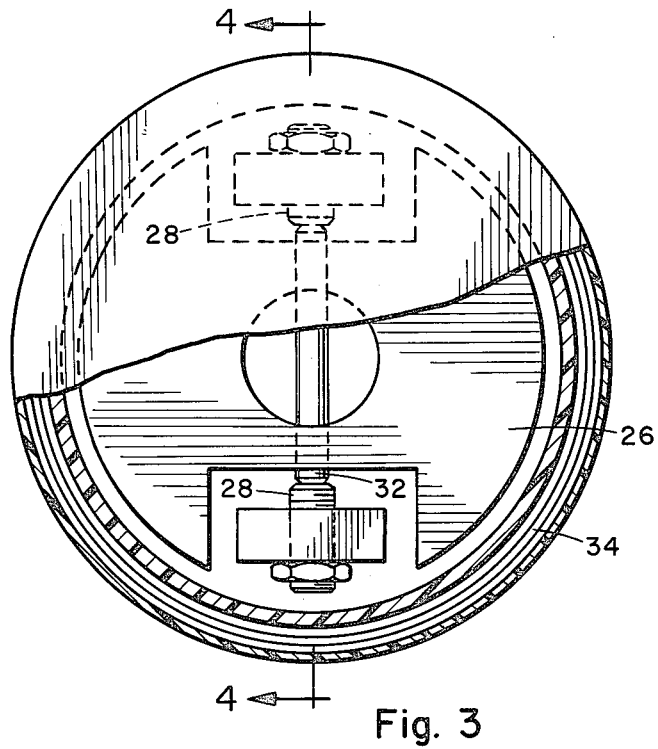
FIG. 3 is an end elevation view of the pitch rate sensor, with a portion cut away.
Figure 4:
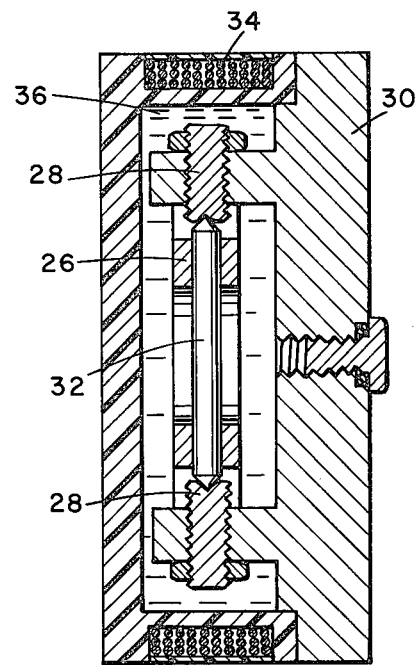
FIG. 4 is a sectional view taken on line 4—4 of FIG. 3.

A configuration for a suitable angular rate sensor capable of detecting pitch rate in the control plane is illustrated in FIGS. 3 and 4. The device incorporates a magnetic flapper 26 which is mounted for pivotal movement about an axis defined by the bearings 28 on base 30 and the pivot pin 32 on flapper 26. The device is mounted on the longitudinal axis of the airframe with the rotational axis of the flapper 26 offset by 90° from the rotational axis of the control surfaces 14. An inductive pick-off assembly 34 is received over the flapper 26 and seals against the base 30 to form a reservoir for damping fluid 36. Since the sensor rotates with the airframe, a gyroscopic effect is produced on the flapper 26 which in conjunction with the damping fluid 36 stabilizes the position of the magnetic flapper and therefore, a zero output is produced by the inductive pick-off 34. However, when action of the control surfaces 14 causes the airframe to pitch in the control plane, the angular velocity of that pitching movement determines the degree to which the magnetized flapper will precess, thereby causing the magnetized material to approach the inductive pick-off assembly 34 and produce a signal output corresponding to the angular velocity or pitch rate. The signal produced by the sensor will be roll related. That is, there will be a cyclical variation in the output of the sensor equal to the roll rate of the airframe and having a maximum value when the control plane orientation corresponds to the direction in which the desired missile flight path lies.

Figure 5:
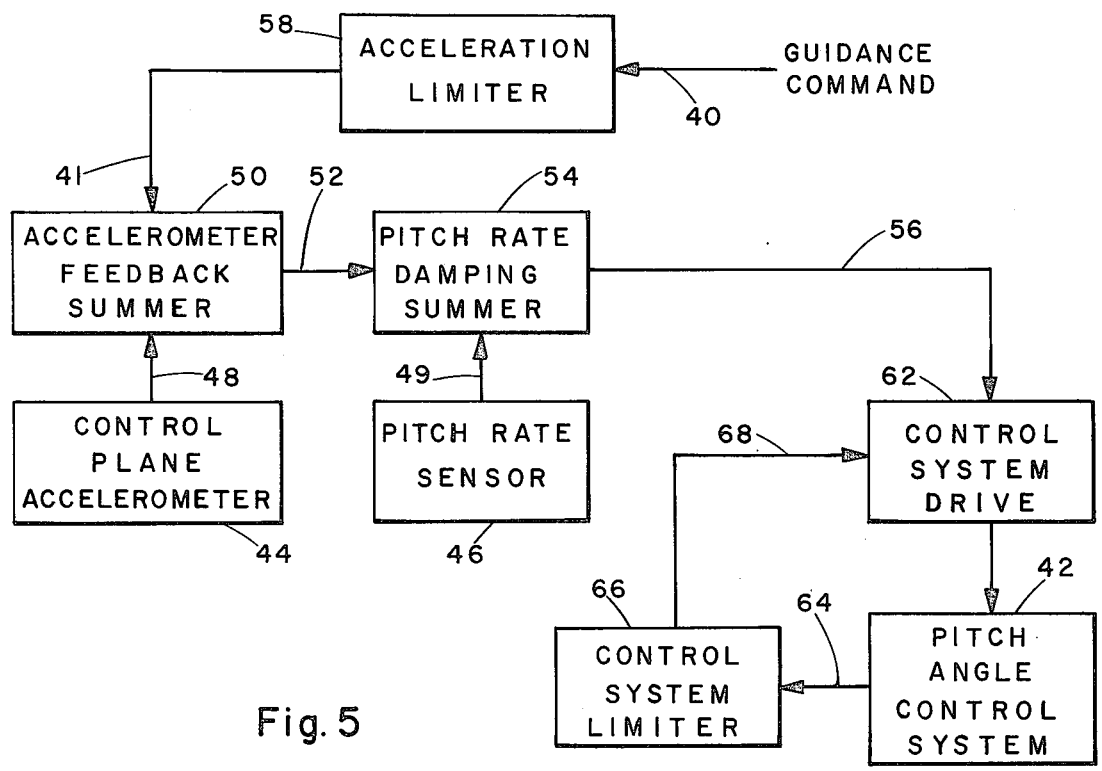
FIG. 5 is a block diagram of the control system.

Referring now to FIG. 5, there is illustrated the system block diagram circuit for the invention. A guidance command signal such as is present in existing open-loop rolling missile control systems is delivered on line 40. The pitch angle control system 42, which in the instant embodiment are the variable incidence canard surfaces 14, is controlled by the output of the autopilot. Varying the incidence of the control surfaces produces lift on the control surfaces which rotate the body of the airframe in the control plane and causes the airframe to assume an angle of attack relative to the previous flight path. The angle of attack results in airframe produced lift and therefore, an acceleration toward the desired flight path. The maximum magnitude of the guidance command signal is governed by a variable acceleration limiter 58 to limit the maximum G forces or angle of attack to which the airframe is exposed. The acceleration limiter may be a variable limiter governed by time from launch (velocity related) and altitude (air density related). The acceleration is detected by the control plane accelerometer 44 and the angular velocity of the pitch produced by the pitch angle control system 42 is detected by the pitch sensor 46. The inverted physical orientation of the control plane accelerometer produces a negative acceleration feed-back signal on line 48 which is summed with the acceleration limiter signal on line 41 by an acceleration feed-back summer 50. The output of the acceleration feed-back summer comprises an undamped control signal on line 52 which is delivered to the pitch rate damping summer 54. The output of the pitch rate sensor on line 49 is summed with the undamped control signal on line 52 by the summer 54 producing a damped control signal on line 56. The damped control signal is delivered on line 56 to the control system drive 62. In the preferred embodiment, the control system drive 62 comprises the servo 18 which is mechanically connected to the pitch angle control system 42 in the form of the variable incidence canard control surfaces 14. A signal corresponding to the incidence angle which the control surfaces 14 has assumed, is derived from the pitch angle control system 42 and delivered on line 64 to a control system limiter 66. The control surfaces have mechanical limits. The output of the control system limiter on line 68 limits the control system drive 62 so that a control surface incidence angle in excess of the aforementioned limits will not be commanded.

Figure 6A:
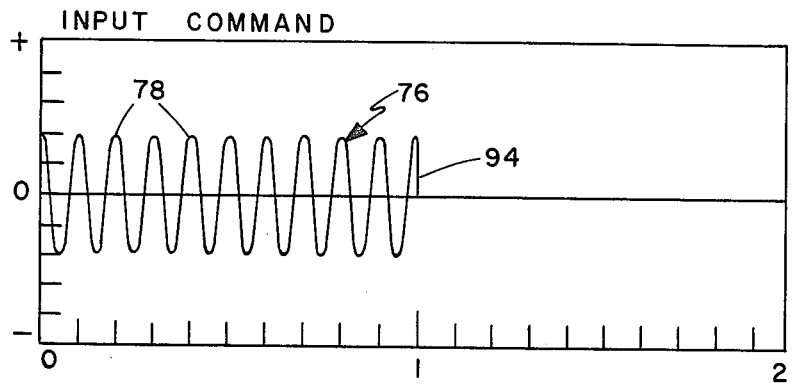
FIG. 6a through 6g illustrate graphically the system operating parameters.
Figure 6B:
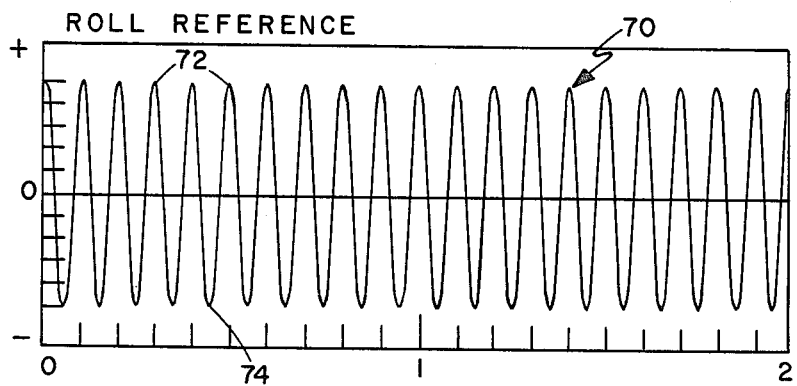

Referring now to FIGS. 6a through 6g, there are illustrated diagramatically the pertinent control surface and signal parameters of the invention in a typical flight maneuver. For purposes of this series of diagrams, it is assumed that the airframe is in a horizontal flight path and that a guidance command signal is inputed to the autopilot system calling for a earth related vertical upward correction. FIG. 6b illustrates the roll orientation of the airframe relative to the earth. The trace 70 is a representation of the instantaneous position of the control plane. Point 72 on the trace is representative of the control plane in a vertical position with the vehicle related up portion of the control plane corresponding to earth vertical upwards direction. The point 74 corresponds to the control plane being in a vertical orientation but with airframe vertical being 180° from earth related vertical. The roll rate as illustrated is 10 cycles per second.

The input command illustrated in FIG. 6a calls for the airframe to turn upwardly from the horizontal flight path. It will be noted that the trace 76 has a cyclical variation of 10 Hertz, corresponding to the roll rate, and reaches a maximum at points 78 corresponding to the vertically upward orientation of the control plane. As will appear more completely from FIG. 6, the incidence angle of the control surfaces illustrated in FIG. 6f is governed by a combination of the guidance command signal, the accelerometer signal and the pitch rate sensor signal. In the illustrated example, pitch rate and acceleration are initially zero. Therefore, the initial positive peak of the input command 78 produces a high initial positive deflection or angle of incidence on the control system 14 as is illustrated by the point 80 on wing incidence trace 82. The initial deflection of the control system produces a corresponding acceleration in the control plane. FIG. 6g illustrates the acceleration in the control plane by trace 98. It will be noted that acceleration builds from zero to a maximum in approximately two rotations of the airframe. The acceleration signal is equal in frequency but opposite in sense to that of the input command. Accordingly, when summed by the acceleration feed-back summer 50 gradually reduces the undamped control surface incidence as is reflected by the reduction in amplitude of the trace 82 with further rotations. The pitch rate sensor illustrated in FIG. 6e is also responsible for the damping or decreasing of the output of the control surface incidence. The high initial pitch rate reflected by the trace 86 results from the high initial deflection from the control surfaces. In time, the output of the pitch rate sensor reduces the undamped control signal and produces a stabilized pitch rate as is suggested by the portion 88 of trace 86.

Figure 6C:
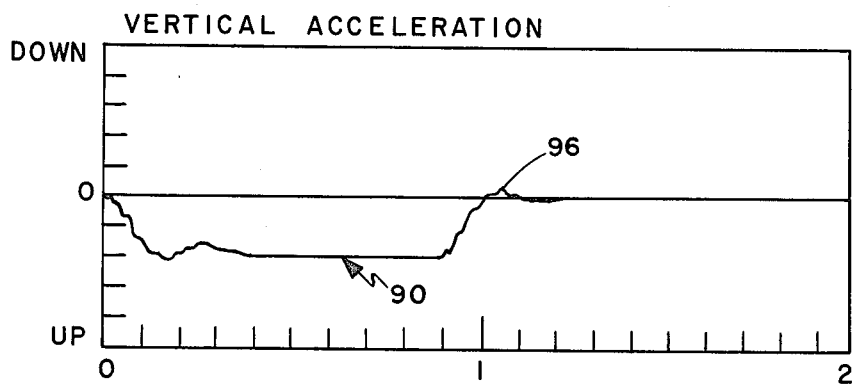
Figure 6D:
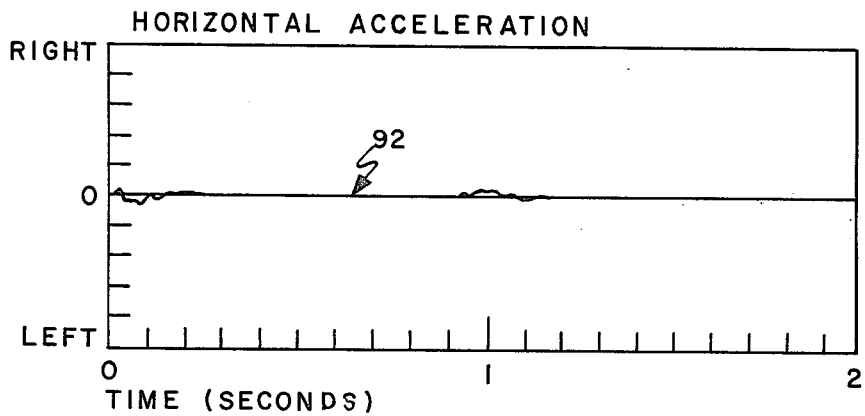
Figure 6E:
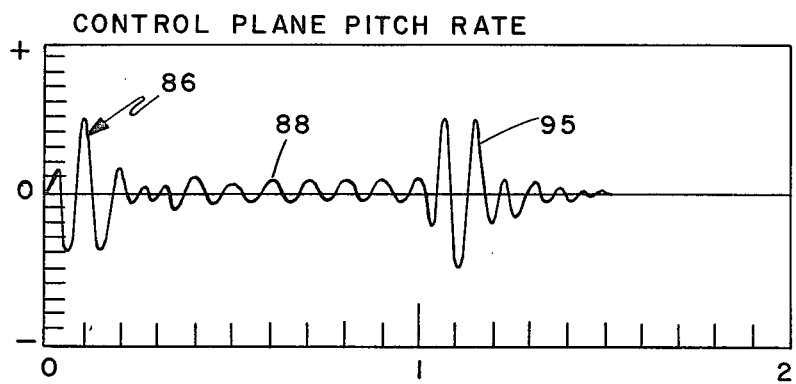
Figure 6F:
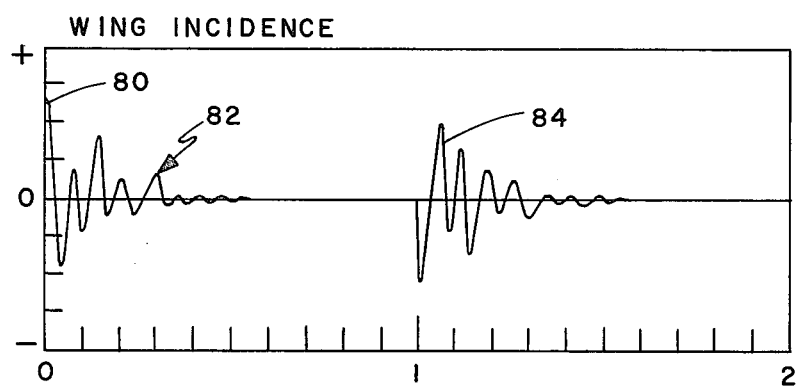
Figure 6G:
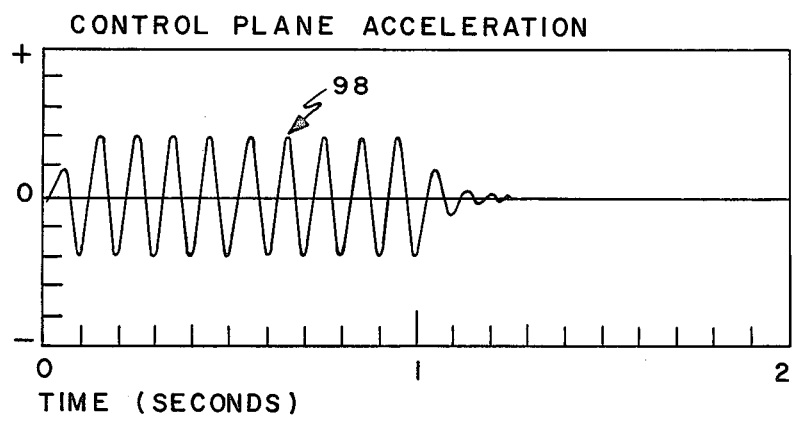

Since the movements of the control surfaces have been timed to correspond to the coincidence of the control plane with the direction toward the flight path intended (vertically upward), there is an acceleration of the vehicle in the earth related upward direction as is illustrated in FIG. 6c by the trace 90. It will be noted that the trace reaches a maximum level in approximately one and one-half revolutions and sustains that level throughout the duration of the control excursions with very little over-shoot. The corresponding trace 92 in FIG. 6d for the earth related horizontal plane shows that substantially all of the acceleration is in the direction of intended change for the flight path. When the input command terminates, as is illustrated in FIG. 6a at point 94, a wing incidence sequence substantially the reverse of that occuring when the command signal commenced is initiated. This wing incidence sequence is illustrated in FIG. 6f as portion 84 of the trace 82. It will be noted that the maximum signal now corresponds to the inverted position of the control plane and therefore, causes the vehicle to pitch back towards its original flight attitude. Since the input command terminated the wing incidence is almost solely a function of the acceleration signal 98, this acceleration signal then is the equivalent of static stability such as is utilized in open-loop control in maintaining a constant flight attitude in the absence of a control signal. The portion 95 of the pitch rate signal 86 in FIG. 6e reflects response of the pitch rate sensors to the opposite angular velocity. The effect of pitch rate damping summer 54 is to enhance the acceleration signal at this portion of the control sequence, to thereby produce a damping of the commanded wing incidence and as a result, to prevent overshoot. It will be noted that only a minimal overshoot of the vertical acceleration as evidenced by portion 96 of FIG. 6c is experienced. The wing incidence and pitch rate damp out in the next five revolutions and reach zero at approximately the same point, representing the return of the airframe to a zero-angle-of-attack, stable-flight, mode.

Having described my invention, I now claim:

1. An autopilot for an intentionally continuously axially rolling airframe having a pitch angle control system for producing pitch rotation of the airframe in a control plane in response to a rotation related guidance command signal to said control system by a control circuit comprising:
   an accelerometer means responsive to cyclically varying acceleration for mounting on the airframe and for detecting acceleration in the control plane and transverse to the longitudinal axis of the airframe during the continuous rolling of the airframe as a function of the rotation of said airframe and for producing acceleration signals corresponding to the detected acceleration,
   acceleration feed-back summer means in the control circuit for summing said acceleration signal and the guidance command signal to produce a control signal, said acceleration signal is summed as a negative feed-back to said guidance command signal,
   and control system drive means for driving said control system to produce a change in the pitch angle of attack in response to said control signal.

2. The autopilot according to claim 1 further comprising:
   pitch rate sensor means mounted on said airframe for detecting the rate of change of said pitch angle of attack as a function of the rotational orientation of said airframe and for producing an pitch rate signal corresponding to the detected rate,
   pitch rate damping feed-back summer means in said control circuit for summing said control signal and said pitch rate signal to produce a damped control signal.

3. The autopilot according to claim 1 wherein:
said accelerometer means comprises solid state acceleration sensors.

4. The autopilot according to claim 1 wherein:
said accelerometer means comprises an acceleration sensor in wheatstone bridge.

5. The autopilot according to claim 1 wherein:
said control system drive means comprises a servo motor and variable incidence control surfaces.

6. The autopilot according to claim 5 wherein:
said control surfaces comprise delta planform canard surfaces.

7. The autopilot according to claim 2 wherein:
said pitch rate sensor means comprises a sensor response to a cyclically varying pitch rate.

8. The autopilot according to claim 7 wherein:
said pitch rate sensor means comprises a sensor stabilizer by airframe roll.

* * * * *